Feb. 24, 1953     H. P. LUNDGREN ET AL     2,629,723

WOOL SCOURING PROCESS

Filed June 20, 1950

H.P. LUNDGREN,
W. FONG & A.S. YEISER
INVENTORS

ATTORNEYS

Patented Feb. 24, 1953

2,629,723

UNITED STATES PATENT OFFICE 2,629,723

WOOL SCOURING PROCESS

Harold P. Lundgren, Berkeley, Willie Fong, San Francisco, and Andrew S. Yeiser, Berkeley, Calif., assignors to the United States of America as represented by the Secretary of Agriculture Application June 20, 1950, Serial No. 169,278

11 Claims. (Cl. 260—412.5)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application relates to the scouring of raw wool to produce a clean, essentially grease-free wool and to recover the grease extracted.

In the prior art processes of scouring wool, various aqueous extraction methods are employed. In one such method, an extraction liquid is used which contains essentially water, soap, and sufficient soda ash or other alkaline material to render the liquor strongly alkaline in reaction. In this process, removal of fat from the wool is efficient but the recovery of the grease from the extraction liquor is difficult. Although many schemes have been advanced for recovering the grease, the fact of the matter is that most wool processors merely dump the spent extraction liquor in streams. This practice has resulted in pollution of many streams and rivers. Another disadvantage of this process is that the pH of the scouring solution is so high that there is danger of serious damage to the wool fibers. Another aqueous extraction method which is used in wool scouring is the suint method. In this procedure the suint, a natural component of raw wool is extracted with water and the resulting aqueous solution is used in the scouring treatment the suint acting as an emulsification agent. The suint process has the advantage that the treatment is mild and does not damage the fibers but the process does not reduce the grease content of the wool to a sufficiently low level and further recovery of the grease from the extraction liquor is difficult.

We have now devised a process which possesses the advantages of both types of procedures outlined above. Thus our process produces a defatted wool of low residual fat content and at the same time the recovery of the fat from the spent extraction liquor is relatively simple and efficient.

In accordance with the process of this invention, essentially the following procedure is employed:

(A) The wool is extracted with an aqueous liquor containing an emulsification agent, a polar, neutral, oxygenated organic compound and preferably also a neutral inorganic electrolyte. Thus a typical extraction liquor for use in extracting (scouring) raw wool might contain water, 2–3% butanol, and sodium chloride in a concentration of 0.1 normal plus the suint salts normally present in the wool which dissolve in the extracting liquor and which act as the emulsification agent. The dissolved suint salts may be supplemented by additional soap or a synthetic detergent to the extraction liquor. The functions of the added oxygenated organic solvent and neutral inorganic salt are explained hereafter.

(B) The spent extraction liquor is then subjected to a regeneration treatment involving removal from it most of the fat so that the regenerated liquor can be further used for extracting fresh batches of raw wool. The regeneration procedure involves essentially mixing the spent liquor with additional amounts of the polar, neutral, oxygenated organic compound to increase the total concentration of this agent. Thereby the fat is separated out of solution. The manner in which the separation occurs depends on the type of organic compound used. Thus when butanol, or other organic compound partly miscible with water, is used in the extracting liquor, addition of more butanol causes separation of a butanol phase saturated with water and containing a high proportion of the fat. This phase may then be removed and treated as by distillation to separate the fat, the distilled butanol being returned to the process. In some cases, depending on the concentration of the fat, a third phase may also separate—this being a fat phase saturated with both butanol and water. In such event this fat phase is likewise removed and treated to recover the fat. When ethanol or other completely water-miscible compound is used, further addition of ethanol causes precipitation of the fat as such either liquid or solid depending on the temperature which can then be separated as by filtration or centrifugation. In any case the liquor from which the fat has been removed is subjected to distillation to lower its content of the organic compound to the level which is optimum for re-use in the extraction. The overhead from this distillation being of a high concentration of organic compound is used in the previous step to increase the total concentration of organic compound.

In the extraction step we use the same type of extracting liquor as disclosed in the patent application of H. P. Lundgren and W. Fong, Ser. No. 152,271, filed March 27, 1950.

The problems which are of concern to the extraction and the ways in which these problems are overcome are explained below.

Raw wool scouring is the preliminary step in the processing of wool in which the impurities present in the wool are removed by suitable physical or chemical means. The process is of great importance in the success of subsequent operations, such as carding, drawing, spinning, weaving, dyeing, etc.

The nature and the quantity of the impurities in raw wool vary, depending to a certain extent upon the breed of the animal and the geographical, climatic or nutritional conditions under which it is raised. Generally speaking, these impurities may be classified into two broad categories, (1) acquired impurities, such as earthy material, vegetable matter, faecal matter, paint, tar, etc., and (2) the natural impurities secreted by the animal.

These natural impurities consist of two major components, wool suint and wool grease. Together these two components are commonly known as wool yolk.

Wool suint is the dried, water-soluble material secreted by the sweat gland of the animal. Chemically, very little is known concerning the exact composition of the substance; however, investigators agree that it consists essentially of the potassium salts of high molecular weight fatty acids. Wool suint possesses some detergent power which is utilized in the known aqueous scouring processes as will be explained hereinafter.

The wool grease is a complex water insoluble mixture of fats and oils secreted by the sebaceous glands of the sheep. This material protects the wool fibers against the elements during its growth. Strictly speaking, the greasy component of wool is a wax, the ester of a high molecular weight monohydric alcohol and a fatty acid. The component wool wax alcohols consist of three major series: (1) the sterols, principally cholesterol, (2) the tri-terpene-like alcohols, principally lanosterol, and (3) aliphatic alcohols. The component wool wax acids consist of four major series: (1) the normal fatty acids, (2) hydroxy acids, (3) branched chain acids, and (4) iso acids.

Commercially, the greater portion of the wool scoured in this country, as well as abroad, is accomplished by aqueous means in an alternating series of bowls and squeeze rolls through which the wool is propelled with a gentle mechanical action. In this aqueous process there are two basic systems known as the emulsification process and the Duhamel or suint process, respectively. In the emulsification process, soap or synthetic detergent and soda ash, added in varying amounts to all bowls except the final rinse bowl, perform the major scouring action. In the suint scouring process, the wool is first steeped in lukewarm water to dissolve the water soluble suint salts. This suint solution is then clarified by filtering and centrifuging and returned to the first two bowls as the major scouring agent.

Neither the emulsification nor the suint process are entirely satisfactory for the following reasons. In the case of the emulsification process, the pH of the scouring solution is so high that there is danger of serious damage to the wool fibers. Further, the recovery of the by-products, the suint and the wool grease, from the spent scouring liquor is difficult. In the suint process the treatment is mild and does not damage the fibers but it does not reduce the grease content of the wool to the low levels required by the industry.

In our process, as in the process of the Fong and Lundgren patent application referred to above, the wool is scoured with an aqueous medium containing a neutral, polar, oxygenated organic compound and preferably containing a neutral electrolyte in addition to the organic compound. During the scouring treatment, the suint from the raw wool dissolves in the scouring medium and its effectiveness in emulsifying grease is enhanced by the presence of the aforementioned agent or agents. Thus such technique is an improvement on the known suint process in that the emulsification properties of the suint which dissolves in the aqueous scouring medium is utilized and moreover the effectiveness of this material is increased. An advantage of the improved process is that the mild action of the known suint process is retained and at the same time its effectiveness is increased so that the raw wool is scoured to form a finished wool of low grease content as required in commerce.

The scoured wool produced in accordance with our process is not only low in residual grease content but is in a clean and lofty state and relatively free of residual ash. Another feature of our process is the decreased tendency for the fibers to felt during the scouring procedure. Furthermore, our scouring process is performed under mild conditions, at essentially neutral pH, and therefore the wool undergoes no detectable chemical damage or loss in tensile strength or resilience.

In our process, the addition of the neutral, polar, oxygenated organic compound, or organic compound plus neutral electrolyte, to the scouring medium is believed to assist the removal of grease in two ways: (1) by enhancing micelle formation of the suint ions to assist in solubilizing the wool grease, and (2) by the removal of a protective water shell around the grease particles so that the suint can more effectively remove the grease by solubilization. The factors are further explained as follows:

(1) The chemical structure of the suint salts is similar to that of a typical soap, being characterized by a negatively charged polar or water compatible head and a long chain hydrocarbon or water incompatible tail. The suint salts are readily soluble in water and go into solution as ions. Ordinarily, the suint ions tend to aggregate in water to some extent; the micelles which form consist of the hydrocarbon tails oriented together and the negative heads forming an interface at the water boundary. As many as 20 to 50 ions can be involved. It is believed that the micelle form of the suint is capable of solubilizing the water-insoluble wool grease in the micelle hydrocarbon core. In the known suint process, the efficiency of scouring is limited in its effect depending upon the degree of micelle formation of the suint salts dissolved in the scouring medium. In our process, the addition of the neutral, polar, oxygenated organic compound or organic compound and electrolyte to the scouring medium, by altering the dielectric constant and ionic strength of the scouring medium, is believed to favor formation of suint micelles. Thus in our process, advantage is taken of factors which further the formation of micelles whereby the capacity of the suint to solubilize wool grease is markedly increased.

(2) In the natural state, the wool grease is hydrated, that is, each particle of the grease is surrounded by a protecting shell of water. This water acts as a barrier to the interaction of the suint salts or micelles and the grease. By adding the neutral, polar, oxygenated organic compound, or organic compound plus neutral electrolyte, to the scouring medium, this barrier is removed by the greater attraction of the aforesaid organic compound, or organic compound plus electrolyte, for water. After removal of this barrier, the grease can be readily solubilized by the suint salts or micelles.

Our method of scouring is thus an improvement in the known suint method of scouring wool wherein the suint derived from the wool is the active scouring agent and the added neutral, polar, oxygenated organic compound, or organic compound plus neutral electrolyte, enhances the effectiveness of the suint as a scouring agent. However, it is not essential to utilize the suint as the sole scouring agent. Thus one may add a soap or a synthetic detergent to the scouring medium. In such case the same effect is obtained as with suint alone, i. e., the scouring action of the added emulsifying agent (soap or synthetic detergent) is enhanced by the presence of the added neutral, polar oxygenated organic compound, or organic compound plus neutral electrolyte. The point is that the latter agent or agents increase micelle formation of whatever emulsification agent is employed and further act to dehydrate the grease particles, all as described hereinabove. In applying this modification of our invention, one can add to the scouring medium any soap or synthetic detergent commonly used in emulsifying and detergent applications. Thus, one may use any of the well-known alkyl sulphate, alkyl sulphonate, or alkyl aromatic sulphonate detergents. It is known that besides the sulphate or sulphonate group (the hydrophillic group) the compound must also contain a high-molecular weight hydrocarbon or hydrophobic group. There must be a balance between these opposed groups to give the compound the requisite detergent properties. Usually the hydrocarbon group must contain about 8 to 18 carbon atoms in the case of alkyl sulphates or sulphonates and about 14 to 28 carbon atoms in the case of alkyl aromatic sulphonates to give the proper balance. These compounds are generally employed in the form of their salts, i. e., their potassium sodium, ammonium, or amine salts. Some of the particular detergents which we may use are: sodium octyl sulphate, sodium nonyl sulphate, sodium decyl sulphate, sodium undecyl sulphate, sodium dodecyl sulphate, sodium tridecyl sulphate, sodium tetradecyl sulphate, sodium pentadecyl sulphate, sodium hexadecyl sulphate, sodium heptadecyl sulphate, sodium octadecyl sulphate, sodium oleyl sulphate, sodium octyl sulphonate, sodium nonyl sulphonate, sodium decyl sulphonate, sodium undecyl sulphonate, sodium dodecyl sulphonate, sodium tridecyl sulphonate, sodium tetradecyl sulphonate, sodium pentadecyl sulphonate, sodium hexadecyl sulphonate, sodium octadecyl sulphonate, sodium oleyl sulphonate, sodium salt of di-octyl sulphosuccinate, sodium octyl benzene sulphonate, sodium nonyl benzene sulphonate, sodium decyl benzene sulphonate, sodium undecyl benzene sulphonate, sodium dodecyl benzene sulphonate, sodium tridecyl benzene sulphonate, sodium tetradecyl benzene sulphonate, sodium pentadecyl benzene sulphonate, sodium hexadecyl benzene sulphonate, sodium heptadecyl benzene sulphonate, sodium octadecyl benzene sulphonate, sodium tri (isopropyl) benzene sulphonate, sodium tri (isobutyl) benzene sulphonate, sodium tri (isopropyl) naphthalene sulphonate, sodium tri (isobutyl) naphthalene sulphonate, and so forth. The commercially-available detergents are generally not pure compounds but are mixtures of homologous compounds and are quite satisfactory. Thus, for example, the sodium alkyl benzene sulphonate wherein the alkyl group contains 12 to 18 carbon atoms is a well known detergent. Others are: a mixture of sodium alkyl sulphates consisting mostly of sodium lauryl sulphate; a mixture of sodium alkyl phenol sulphonates wherein the alkyl group contains 12 to 18 carbon atoms; and a mixture of sodium alkyl sulphonates wherein the alkyl group contains 10 to 18 carbon atoms. It is evident that the particular detergent used is not critical except that one should be chosen which is generally useful in emulsifying and detergent applications. Regardless of the type of compound chosen, its efficiency to scour wool will be enhanced by applying the teachings of this invention. The concentration of the emulsification agent is not critical within a wide range and depending on the efficacy of the particular agent; the range of concentration may be from about 0.05% to about 5%.

Many different agents within the class of neutral, polar, oxygenated organic compounds can be used in our process. Thus the following are examples of suitable substances in this category: methanol, ethanol, normal propanol, isopropanol, normal butanol, tertiary butanol, butanol-2, isobutanol (2-methyl-propanol-1), amyl alcohols, hexyl alcohols, heptyl alcohols, tetrahydrofurfuryl alcohol, ethylene glycol monomethyl ether, ethylene glycol monoethyl ether, acetone, diacetone alcohol, methyl ethyl ketone, and so forth. If desired, mixtures can be used instead of individual compounds. Thus for example the commercially-available ethanol denaturated with methanol is suitable.

In general, the concentration of organic compounds may be varied from about 0.1% to about 50%. The particular concentration to use in any specific situation depends on many factors as, for example, the nature of the raw wool and especially the nature of the grease and suint associated therewith, the temperature of scouring, the concentration of electrolytes on the scouring solution, the micelle-forming potency of the particular organic compound used, the mechanical efficiency of the scouring process as for instance the degree of agitation, number of scouring operations, efficiency of rinsing, and so forth. The concentration required in any particular case can be easily determined by scouring small samples of wool using varying concentrations of the organic solvent and noting which concentration gives the lowest residual grease content in the scoured wool. Under the conditions used in the experiments set forth in the examples we have found that the following concentrations give good results with some particular compounds:

| Compound | Concentration range giving substantial increase in scouring efficiency, percent | Approx. concentration giving maximum scouring efficiency, percent |
|---|---|---|
| Methanol | 10–50 | 40 |
| Ethanol | 5–40 | 20 |
| n-Propanol | 5–30 | 20 |
| Isopropanol | 5–25 | 10 |
| n-Butanol | 1–6 | 3 |
| n-Pentanol | 0.5–3 | 2.5 |
| n-Hexanol | 0.1–0.6 | 0.5 |
| Acetone | 5–40 | 25 |
| Methanol in presence of electrolyte | 5–40 | 30 |
| Ethanol in presence of electrolyte | 5–40 | 20 |
| n-Propanol in presence of electrolyte | 5–25 | 10 |
| Isopropanol in presence of electrolyte | 5–15 | 10 |
| n-Butanol in presence of electrolyte | 0.5–6 | 3 |
| n-Pentanol in presence of electrolyte | 0.25–2.5 | 1 |
| n-Hexanol in presence of electrolyte | 0.1–0.6 | 0.4 |
| Acetone in presence of electrolyte | 5–40 | 20 |

With regard to the electrolyte, one may use many different salts since the critical point is to supply inorganic ion to the scouring solution. Thus one can use any neutral, soluble salt of sodium, potassium or ammonium. Suitable salts are, for example, alkali metal or ammonium chlorides, sulphates, nitrates, bromides, iodides, fluorides, and so forth. The electrolyte is generally employed in a concentration from about 0.05 to about 0.5 normal. In most instances a concentration of about 0.1 normal is preferred. Salts of magnesium, calcium, or other metals which cause precipitation of insoluble suint salts cannot of course be used in the electrolyte. For the same reason the water used for scouring should be essentially free from calcium, magnesium, iron, and similar metals, that is, the water should be soft. If only hard water is available, it is evident that a small amount of a calcium-sequestering agent may be added to counteract the hardness. Suitable agents are, for example, alkali metal hexametaphosphates, citrates, pyrophosphates, etc.

The scouring treatment is generally effected at temperatures customarily used in scouring wool by the known emulsification or suint procedures, i. e., from about 20° C. to about 70° C. Preferably, our procedure is carried out at elevated temperature, namely, from about 40° C. to about 60° C. to facilitate emulsification of the wool grease.

The following examples are furnished to demonstrate the relative efficiency of various organic solvents. These experimental data, it is understood, are furnished only by way of illustration and not limitation.

For use in the examples set forth below, a standard raw wool was prepared as follows: A lot of raw California wool, of medium fineness, was opened and blended five times in an experimental type opener. The opened wool was then homogenized by repeated hand carding and mixing. This standard wool had a shrinkage of approximately 40% and a grease content of 12% as determined by solvent extraction. The scouring tests were performed by a standardized technique with provisions for uniform control of temperature and the degree of mechanical agitation.

EXAMPLE I

An aqueous solution was prepared containing 2% normal butanol and sodium chloride in a concentration of 0.1 normal.

Four hundred ml. of this solution was placed in a beaker and 3 grams of raw wool was agitated in the solution for 3 minutes while maintaining the temperature at 60° C. The washed wool was squeezed free of solution and re-washed in 400 ml. of a fresh batch of the solution again agitating for 3 minutes at 60° C. The wool was then squeezed free of solution, washed with water, dried and the grease content determined by Soxhlet extraction with benzene. The residual grease content was found to be 0.5%.

The scouring procedure as set forth above was repeated using different scouring solutions, i. e., (a) water, alone; (b) water containing varying concentrations of n-butanol; and (c) water containing sodium chloride in a concentration of 0.1 normal and varying concentrations of n-butanol. The results obtained in these experiments and those obtained from the experiment above are tabulated below:

*Table 1*

| Sample No. | Scouring solution | Residual grease content of wool, percent |
|---|---|---|
| 1 (control) | water | 8.7 |
| 2 | 1% n-butanol | 6.46 |
| 3 | 2% n-butanol | 3.06 |
| 4 | 3% n-butanol | 0.85 |
| 5 | 4% n-butanol | 1.22 |
| 6 | 5% n-butanol | 2.52 |
| 7 | 6% n-butanol | 6.99 |
| 8 | 1% n-butanol plus 0.1 N NaCl | 0.85 |
| 9 | 2% n-butanol plus 0.1 N NaCl | 0.50 |
| 10 | 3% n-butanol plus 0.1 N NaCl | 0.74 |
| 11 | 4% n-butanol plus 0.1 N NaCl | 0.67 |
| 12 | 5% n-butanol plus 0.1 N NaCl | 1.48 |

EXAMPLE II

The scouring procedure of Example I was repeated using as the scouring medium aqueous solutions containing different organic solvents. The following results were obtained:

*Table 2*

| Sample No. | Scouring solution | Residual grease in wool, percent |
|---|---|---|
| 13 | 10% methanol | 6.97 |
| 14 | 20% methanol | 4.67 |
| 15 | 30% methanol | 3.32 |
| 16 | 40% methanol | 2.78 |
| 17 | 50% methanol | 5.42 |
| 18 | 10% methanol plus 0.1 N NaCl | 3.84 |
| 19 | 20% methanol plus 0.1 N NaCl | 1.97 |
| 20 | 30% methanol plus 0.1 N NaCl | 1.12 |
| 21 | 40% methanol plus 0.1 N NaCl | 3.81 |
| 22 | 50% methanol plus 0.1 N NaCl | 7.19 |
| 23 | 10% ethanol | 2.26 |
| 24 | 20% ethanol | 1.32 |
| 25 | 30% ethanol | 2.28 |
| 26 | 10% ethanol plus 0.1 N NaCl | 0.89 |
| 27 | 10% ethanol plus 0.2 N NaCl | 0.81 |
| 28 | 10% ethanol plus 0.3 N NaCl | 0.93 |
| 29 | 10% ethanol plus 0.4 N NaCl | 1.84 |
| 30 | 20% ethanol plus 0.1 N NaCl | 0.70 |
| 31 | 30% ethanol plus 0.1 N NaCl | 2.14 |
| 32 | 10% n-propanol plus 0.1 N NaCl | 0.81 |
| 33 | 20% n-propanol plus 0.1 N NaCl | 3.08 |
| 34 | 10% isopropanol | 1.37 |
| 35 | 10% isopropanol plus 0.1 N NaCl | 0.98 |
| 36 | 20% isopropanol plus 0.1 N NaCl | 1.91 |
| 37 | 0.5% n-amyl alcohol | 6.09 |
| 38 | 1% n-amyl alcohol | 3.87 |
| 39 | 1.5% n-amyl alcohol | 2.53 |
| 40 | 2% n-amyl alcohol | 2.19 |
| 41 | 2.5% n-amyl alcohol | 1.69 |
| 42 | 0.5% n-amyl alchol plus 0.1 N NaCl | 1.62 |
| 43 | 1% n-amyl alcohol plus 0.1 N NaCl | 0.72 |
| 44 | 1.5% n-amyl alcohol plus 0.1 N NaCl | 1.23 |
| 45 | 2% n-amyl alcohol plus 0.1 N NaCl | 3.54 |
| 46 | 2.5% n-amyl alcohol plus 0.1 N NaCl | 3.10 |
| 47 | 0.1% n-hexanol | 6.00 |
| 48 | 0.2% n-hexanol | 5.91 |
| 49 | 0.3% n-hexanol | 5.09 |
| 50 | 0.4% n-hexanol | 4.96 |
| 51 | 0.5% n-hexanol | 3.63 |

| Sample No. | Scouring solution | Residual grease in wool, percent |
|---|---|---|
| 52 | 0.6% n-hexanol | 4.90 |
| 53 | 0.1% n-hexanol plus 0.1 N NaCl | 4.45 |
| 54 | 0.2% n-hexanol plus 0.1 N NaCl | 3.27 |
| 55 | 0.3% n-hexanol plus 0.1 N NaCl | 1.55 |
| 56 | 0.4% n-hexanol plus 0.1 N NaCl | 0.62 |
| 57 | 0.5% n-hexanol plus 0.1 N NaCl | 0.72 |
| 58 | 0.6% n-hexanol plus 0.1 N NaCl | 0.74 |
| 59 | 10% acetone | 4.53 |
| 60 | 20% acetone | 1.95 |
| 61 | 30% acetone | 2.17 |
| 62 | 40% acetone | 5.08 |
| 63 | 10% acetone plus 0.1 N NaCl | 2.21 |
| 64 | 20% acetone plus 0.1 N NaCl | 0.88 |
| 65 | 30% acetone plus 0.1 N NaCl | 3.28 |
| 66 | 40% acetone plus 0.1 N NaCl | 7.17 |

*Example III*

Raw wool was scoured in a batchwise procedure as set forth below. The raw wool had an actual wool content of 60%, the remainder being: grease, 15%; suint, 10%; dirt and vegetable matter, 15%.

Fifteen 10-gram samples of the raw wool were subjected to two scouring operations in sequence. Thus each sample was introduced into a first bowl and agitated 2½ minutes with the aqueous scouring medium, the sample was then withdrawn, passed through squeeze rolls then agitated 2½ minutes with the aqueous scouring medium in the second bowl; the sample was then withdrawn, passed through squeeze rolls, rinsed and dried. Both scouring operations were conducted at 60° C. and the volume of scouring liquor in each bowl was 2 liters. The following table gives the composition of the scouring liquors:

|  | Bowl #1 | Bowl #2 |
|---|---|---|
| Butanol percent | 3 | 3 |
| Sodium stearate do | 0.05 | 0.025 |
| Sodium chloride | 0.1 N | 0.1 N |
| pH | 7.6 | 7.4 |

A total of 90 grams of clean, scoured wool was obtained having a residual grease content of 0.3%.

To the spent scouring liquor from both bowls was added sufficient butanol to bring the total butanol concentration to 10%. The mixture was allowed to stand whereby it was observed that a series of phases were formed. These were, starting from the top, (1) a butanol phase saturated with water and containing much of the grease, (2) a grease layer, (3) an amber-colored, optically-clear water phase saturated with butanol and containing suint and the added emulsifying agent (sodium stearate) and (4) a layer of dirt.

Phases 1 and 2 were removed by decanting and the butanol and water removed by distillation. A 20-gram residue consisting of grease and entrained dirt was recovered.

Phase 3 was separated and subjected to distillation to reduce the butanol concentration to 3%. This regenerated liquor was then used to scour eighteen 5-gram samples of raw wool. The same type of scouring treatment was employed as before using 400 cc. of the regenerated liquor in each bowl and scouring 2½ minutes in each bowl at 60° C. The wool so scoured had a residual grease content of 0.5%.

In the accompanying drawings which are merely given by way of example:

Figure 1:
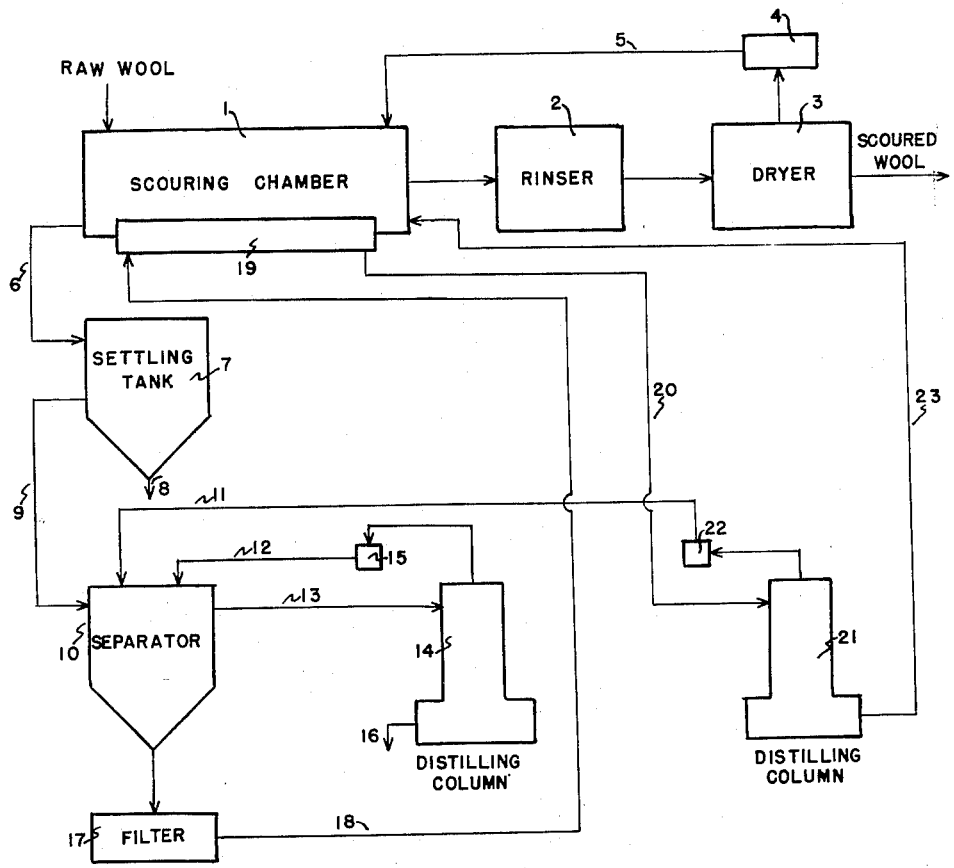
Fig. 1 illustrates by means of a flow sheet the preferred method of carrying out our process in practice.

Referring first to Fig. 1, raw wool, which preferably has been carded or otherwise treated to open it is fed into extractor 1. In this apparatus, the wool is conveyed by suitable means, such as rakes, paddle wheels, or a chain conveyor, countercurrent to the flow of extracting liquor.

After being extracted (scoured), the wool is conveyed to rinser 2, then dryer 3. Dryer 3 is preferably provided with condenser 4 to condense the alcohol vapors, the condensed alcohol being returned to extractor 1 via pipe 5.

The spent extraction liquor from extractor 1 flows through pipe 6 into settling tank 7 where at least part of the insoluble, suspended material such as dirt settles out and may be removed through outlet 8.

The clarified spent liquor then flows through pipe 9 into separator tank 10. Also introduced into tank 10 through pipes 11 and 12 are butanol-water solutions of relatively high butanol content. In separator tank, a phase separation occurs with the formation of (1) an upper phase of butanol saturated with water and containing wool grease, and (2) a lower phase of water saturated with butanol and containing a small proportion of wool grease and essentially all the suint salts, (3) and possibly also a middle phase containing fat saturated with $H_2O$ and alcohol.

The upper phase is removed through pipe 13 and introduced into distillation column 14. If a grease phase is present, this is removed together with the upper phase. The overhead vapors containing a relatively high proportion of butanol are liquefied by condenser 15 and the condensate returned to separator tank 10 via pipe 12.

The undistilled residue from distillation column 14, consisting largely of wool grease, is removed through outlet 16.

The lower phase from separator tank 10 is conducted through filter 17 to remove suspended material such as dirt and the clear water-butanol solution flows through pipe 18 into jacket 19 where it is heated by the hot liquor in extractor 1. The hot water-butanol solution then flows through pipe 20 into distillation column 21.

The overhead vapors from distillation column 21, containing a relatively high proportion of butanol to water are liquefied by condenser 22 and returned via pipe 11 to separator tank 10.

The undistilled residue from distillation column 21, consisting of suint salts dissolved in water saturated with butanol, constitutes the regenerated extracting liquor and flows to extractor 1 via pipe 23. If as the process is continued, the suint concentration rises unduly, the regenerated liquor may be cooled to precipitate part of the suint which may be then removed by filtration, the filtrate being returned to extractor 1.

Figure 2:
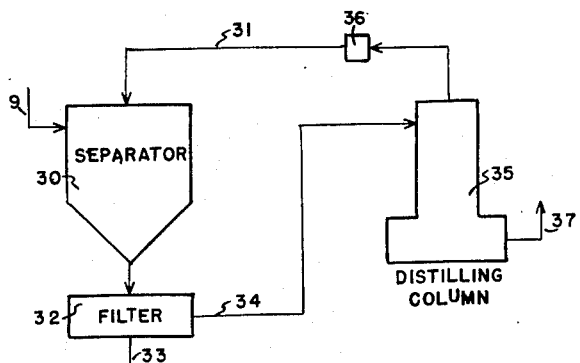
Fig. 2 illustrates by means of a flow sheet an alternative method within the scope of our invention.

Referring to Fig. 2, this figure discloses an alternative method of carrying out our novel process. This method being particularly adapted to be employed when the alcohol in the extractor procedure is completely miscible with water, an example being ethanol. In this process, the extraction, rinsing and drying procedures are as in Fig. 1 but the recovery of grease and extracting liquor are altered as explained below.

In this case, the clarified spent extracting liquor from pipe 9 flows into separating tank 30. Also introduced into tank 30 through pipe 31 is an ethanol-water solution of relatively high ethanol content. In tank 30, most of the wool grease is separated out of solution by the increased ethanol concentration. The slurry so produced is passed through filter (or centrifuge) 32 to separate the liquor from the grease, the latter being removed as indicated by outlet 33. The liquor flows via pipe 34 to distillation column 35. The overhead vapors rich in ethanol are liquefied in condenser 36 and the condensate is returned to tank 30 via pipe 31. The undistilled residue, the regenated ethanol-water solution is removed from the column by pipe 37 to be introduced into the extractor for further extraction of raw wool.

In the step of regenerating the spent extracting (scouring) liquor the object is to precipitate the fat by addition of polar, neutral, oxygenated organic compound to the spent liquor. Depending on the type of organic compound and concentration of fat, the precipitation may involve separation of a fat phase, an organic compound phase containing dissolved fat or both. The amount of additional organic compound to be added to the spent liquor depends on the properties of the compound. Thus, for example if a particular compound is miscible with water to the extent of 5% then additional compound should be added to bring the total concentration to, say, 6% or more whereby to separate the excess compound as a distinct phase containing dissolved fat. Addition of a larger excess of the compound will do no harm but will result in a more dilute solution of fat. In any particular case, the proper amount of organic compound to be added can easily be ascertained by adding the material in small increments noting the point when phase separation appears to be complete. The following table sets forth the minimum concentrations required in particular instances to cause the precipitation:

| Compound | Approximate concentration required to precipitate, percent |
| --- | --- |
| methanol | 40 |
| ethanol | 30 |
| propanol | 20 |
| butanol | 10 |
| n-amyl alcohol | 3 |
| n-hexanol | 0.7 |

Having thus defined our invention, we claim:

1. A process for scouring raw wool and recovering wool grease which comprises: scouring raw wool with an essentially neutral aqueous liquor containing an emulsification agent and a polar, neutral, oxygenated organic compound; separating spent scouring liquor from the scoured wool; mixing the spent scouring liquor with sufficient additional polar, neutral, oxygenated organic compound to separate a phase rich in wool grease; removing said phase rich in wool grease; regenerating the remainder of the liquor by distillation to reduce its concentration of said organic compound; and subjecting another batch of raw wool to scouring with said regenerated liquor.

2. A process for scouring raw wool and recovering wool grease which comprises: scouring raw wool with an essentially neutral aqueous liquor containing an emulsification agent, a polar, neutral, oxygenated organic compound, and a neutral inorganic electrolyte; separating spent scouring liquor from the scoured wool; mixing the spent scouring liquor with sufficient additional polar, neutral, oxygenated organic compound to separate a phase rich in wool grease; removing said phase rich in wool grease; regenerating the remainder of the liquor by distillation to reduce its concentration of said organic compound; and subjecting another batch of raw wool to scouring with said regenerated liquor.

3. A process for scouring raw wool and recovering wool grease which comprises: scouring raw wool with an essentially neutral aqueous liquor containing an emulsification agent and a polar, neutral, oxygenated organic compound; separating spent scouring liquor from the scoured wool; mixing the spent scouring liquor with sufficient additional polar, neutral, oxygenated organic compound to separate a phase rich in wool grease; removing said phase rich in wool grease; subjecting the remainder of the liquor to distillation to obtain a fraction containing said organic compound and an undistilled fraction being regenerated scouring liquor; mixing said organic compound fraction with said spent scouring liquor to supply part of said additional organic compound; and subjecting another batch of raw wool to scouring with said undistilled fraction being regenerated scouring liquor.

4. A process for scouring raw wool and recovering wool grease which comprises: scouring raw wool with an essentially neutral aqueous liquor containing an emulsification agent and a polar, neutral, oxygenated organic compound which is completely miscible with water; separating spent scouring liquor from the scoured wool; mixing the spent scouring liquor with sufficient additional organic compound of the aforesaid type to separate a phase rich in wool grease; removing said phase rich in wool grease; subjecting the remainder of the liquor to distillation to obtain a fraction containing said organic compound and as undistilled fraction being regenerated scouring liquor; mixing said organic compound fraction with said spent scouring liquor to supply part of said additional organic compound; and subjecting another batch of raw wool to scouring with said undistilled fraction being regenerated scouring liquor.

5. The process of claim 4 wherein the organic compound is methanol.

6. The process of claim 4 wherein the organic compound is ethanol.

7. The process of claim 4 wherein the organic compound is a propanol.

8. A process for scouring raw wool and recovering wool grease which comprises: scouring raw wool with an essentially neutral aqueous medium containing an emulsification agent and a polar, neutral, oxygenated organic compound which is partially miscible with water; separating spent scouring liquor from the scoured wool, mixing the spent scouring liquor with sufficient additional organic compound of the aforesaid type to cause formation of at least the following phases: (1) an organic compound phase containing wool grease and (2) an aqueous phase containing the emulsification agent and organic compound; subjecting the organic compound phase to distillation to obtain a fraction containing said organic compound and an undistilled fraction containing wool grease; mixing the organic compound fraction with spent scouring liquor to supply part of said additional organic compound; subjecting said aqueous phase to distillation to obtain a fraction containing said organic compound and an undistilled fraction being regenerated scouring liquor; mixing the organic compound fraction with spent scouring liquor to supply part of said additional organic compound; and subjecting another batch of raw wool to scouring with said undistilled fraction being regenerated scouring liquor.

9. The process of claim 8 wherein the organic compound is a butyl alcohol.

10. The process of claim 8 wherein the organic compound is an amyl alcohol.

11. A process for scouring raw wool and recovering wool grease which comprises: scouring raw wool with an essentially neutral aqueous medium containing dissolved suint acting as an emulsification agent and butanol in a concentration from about 0.5% to about 6%; mixing the spent scouring liquor with sufficient additional butanol to raise the total butanol concentration to at least 9% whereby to cause formation of at least the following phases: (1) a butanol phase containing the grease and (2) an aqueous phase containing the suint and butanol; subjecting said butanol phase to distillation to obtain a butanol fraction and an undistilled fraction containing the grease; mixing the butanol fraction with said spent scouring liquor to supply part of said additional butanol; recovering the grease from the undistilled fraction; subjecting said aqueous phase to distillation to obtain a butanol fraction and an undistilled fraction being regenerated scouring liquor; mixing the butanol fraction with said spent extraction liquor to supply part of said additional butanol; and subjecting another batch of raw wool to scouring with said undistilled fraction being regenerated scouring liquor.

HAROLD F. LUNDGREN.
WILLIE FONG.
ANDREW S. YEISER.

REFERENCES CITED

The following references are of record in the file of this patent:

UNITED STATES PATENTS

| Number | Name | Date |
|---|---|---|
| 2,200,390 | Freeman | May 14, 1940 |
| 2,421,094 | Totney | May 27, 1947 |
| 2,445,931 | Beckel et al. | July 27, 1948 |
| 2,480,221 | Caplan | Aug. 30, 1949 |
| 2,485,916 | Perez | Oct. 25, 1949 |
| 2,515,794 | Palmer | July 18, 1950 |

OTHER REFERENCES

"Wool Wax" text by D. T. C. Gillespie, published by Hobart Pub. Co., Washington 15, D. C. pages 22, 23, 24, 25, 28, 30